US012089728B2

(12) United States Patent
Seo

(10) Patent No.: US 12,089,728 B2
(45) Date of Patent: Sep. 17, 2024

(54) SKIN CARE DEVICE AND OPERATION METHOD THEREFOR

(71) Applicant: LG ELECTRONICS INC., Seoul (KR)

(72) Inventor: Sungkwan Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 452 days.

(21) Appl. No.: 17/593,343

(22) PCT Filed: Mar. 20, 2019

(86) PCT No.: PCT/KR2019/003256
§ 371 (c)(1),
(2) Date: Sep. 15, 2021

(87) PCT Pub. No.: WO2020/189824
PCT Pub. Date: Sep. 24, 2020

(65) Prior Publication Data

US 2022/0175127 A1 Jun. 9, 2022

(51) Int. Cl.
*A46B 13/02* (2006.01)
*A46B 7/04* (2006.01)
(Continued)

(52) U.S. Cl.
CPC .............. *A46B 13/023* (2013.01); *A46B 7/04* (2013.01); *A46B 9/02* (2013.01); *A46B 13/008* (2013.01);
(Continued)

(58) Field of Classification Search
CPC ........... A46B 13/023; A46B 7/04; A46B 9/02; A46B 13/008; A61H 7/005; A61H 23/0254; A61H 2201/1685; A61H 2201/5058
See application file for complete search history.

(56) References Cited

U.S. PATENT DOCUMENTS

2017/0049278 A1* 2/2017 Thomassen .......... A46B 13/023
2018/0279762 A1 10/2018 Park et al.
2020/0113322 A1* 4/2020 Balestrini ............ A46B 13/008

FOREIGN PATENT DOCUMENTS

CN 206403686 8/2017
CN 108024621 5/2018
(Continued)

OTHER PUBLICATIONS

PCT International Application No. PCT/KR2019/003256 International Search Report dated Dec. 13, 2019, 4 pages.
(Continued)

*Primary Examiner* — Cortez M Cook
(74) *Attorney, Agent, or Firm* — LEE, HONG, DEGERMAN, KANG & WAIMEY

(57) ABSTRACT

A skin care device according to an embodiment of the present disclosure includes a brush module mounting part on which a brush module having a brush fixed thereto is mounted, a vibration motor configured to vibrate the brush module mounting part and the brush module in one direction, a rotating shaft formed in the one direction and configured to be fastened to the brush module mounting part, a rotating motor configured to be connected to the rotating shaft, a mounting detection sensor configured to be obtain a sensing value related to a mounting of the brush module, and a controller configured to detect a type of the mounted brush module on the basis of the sensing value and control driving of at least one of the vibration motor and the rotating motor according to a detected type.

12 Claims, 9 Drawing Sheets

(51) Int. Cl.

| | |
|---|---|
| ***A46B 9/02*** | (2006.01) |
| ***A46B 13/00*** | (2006.01) |
| ***A46B 15/00*** | (2006.01) |
| ***A47K 7/04*** | (2006.01) |
| ***A61H 7/00*** | (2006.01) |
| ***A61H 23/02*** | (2006.01) |

(52) U.S. Cl.
CPC ............ *A46B 15/0026* (2013.01); *A47K 7/04* (2013.01); *A61H 7/005* (2013.01); *A61H 23/0254* (2013.01); *A46B 2200/102* (2013.01); *A61H 2201/1685* (2013.01); *A61H 2201/5058* (2013.01)

(56) References Cited

FOREIGN PATENT DOCUMENTS

| | | |
|---|---|---|
| JP | 2005512708 | 5/2005 |
| KR | 1020150085838 | 7/2015 |
| KR | 1020150086512 | 7/2015 |
| KR | 101848623 | 4/2018 |
| KR | 101852410 | 4/2018 |

OTHER PUBLICATIONS

State Intellectual Property Office of the People's Republic of China Application Serial No. 201980094397.6, Office Action dated Mar. 30, 2023, 10 pages.

* cited by examiner

【Fig. 1】
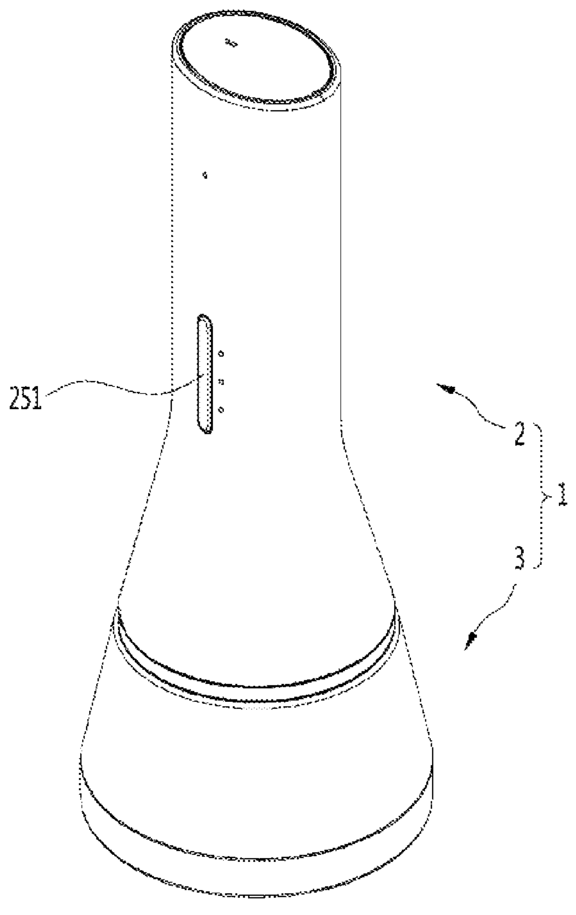

【Fig. 2】
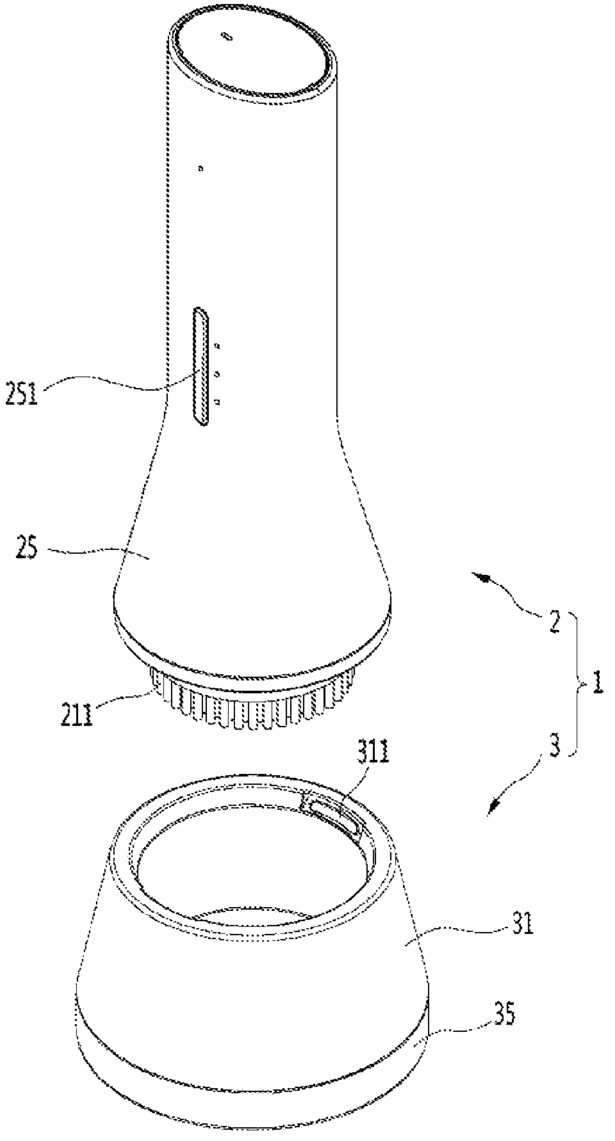

【Fig. 3】
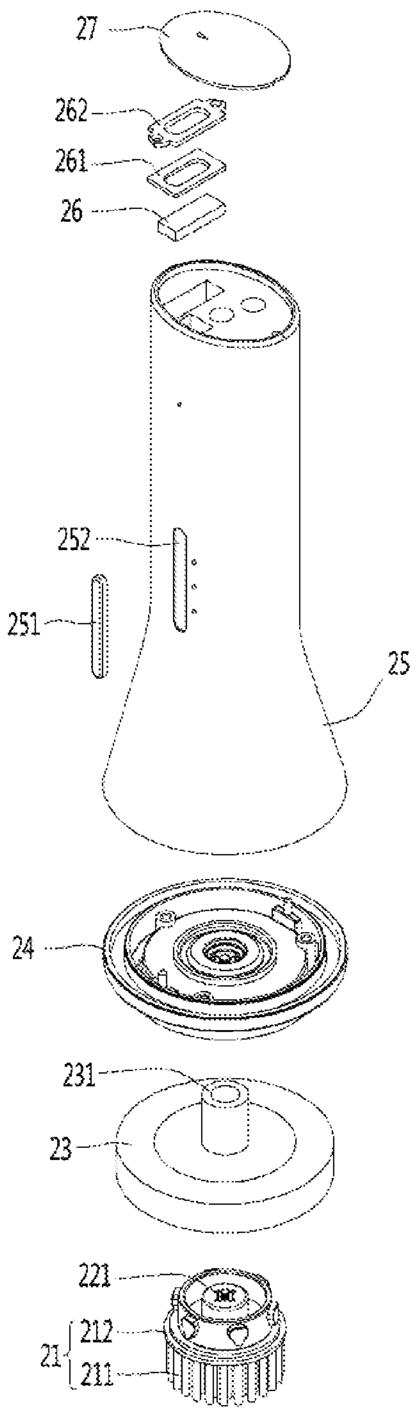

【Fig. 4】
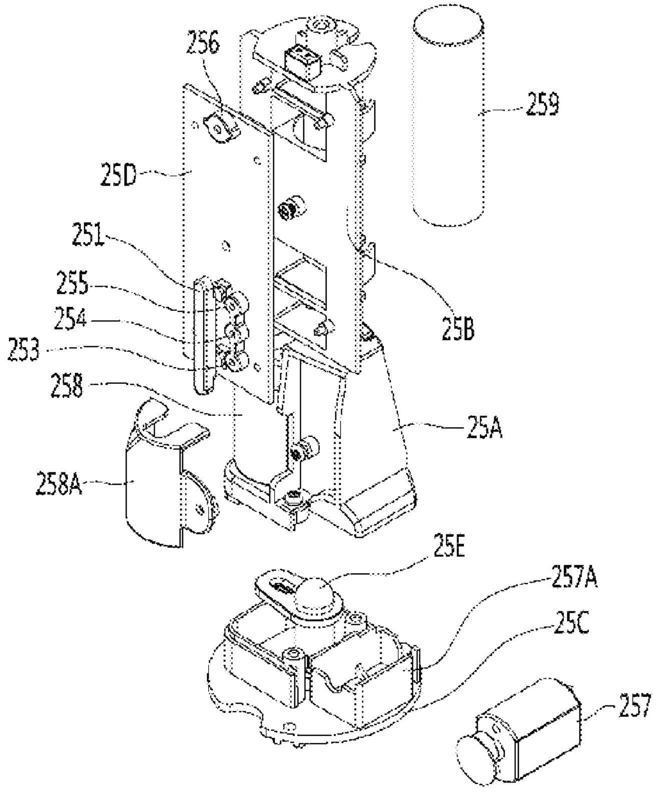

【Fig. 5】
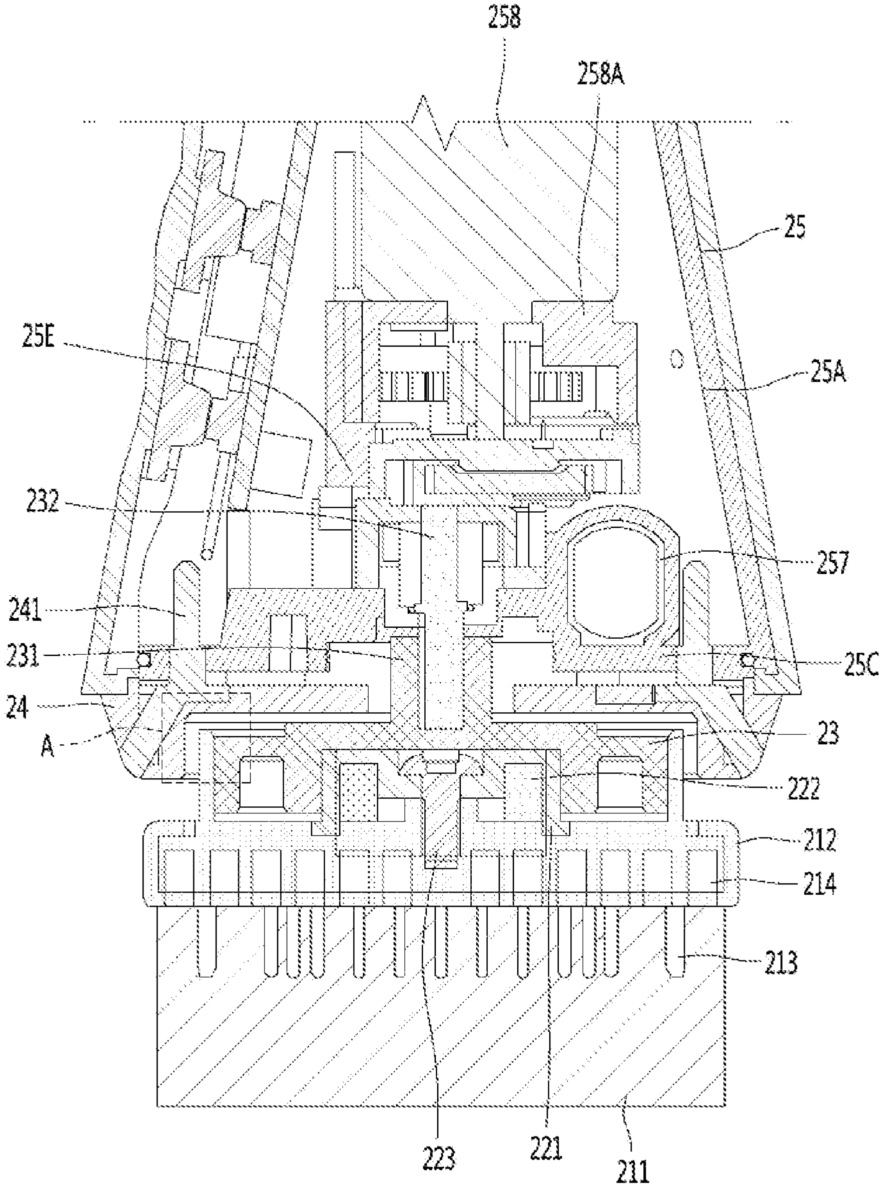

【Fig. 6】
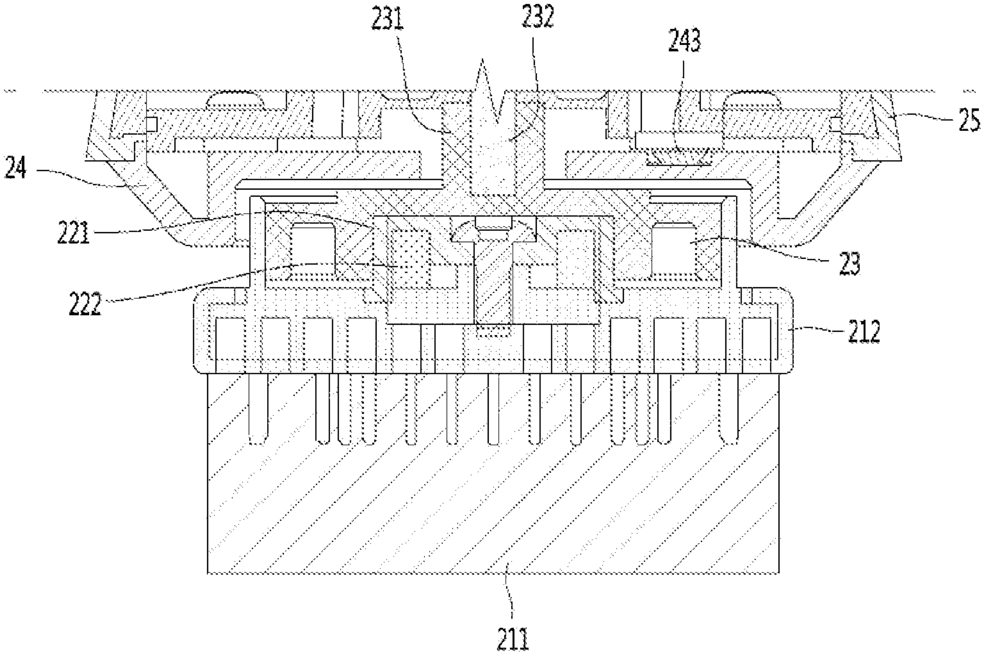
【Fig. 7】
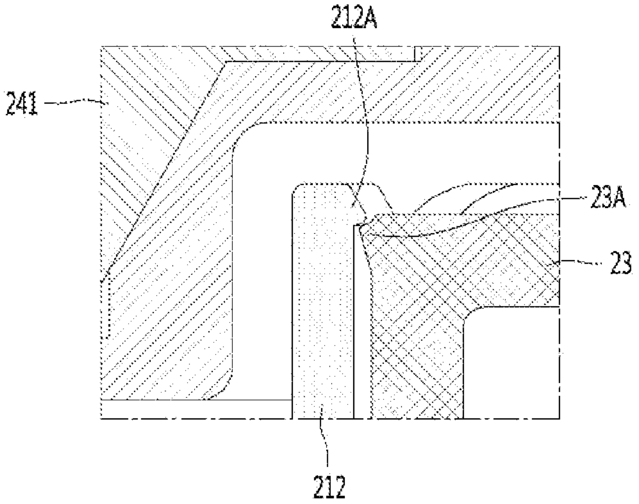

【Fig. 8】
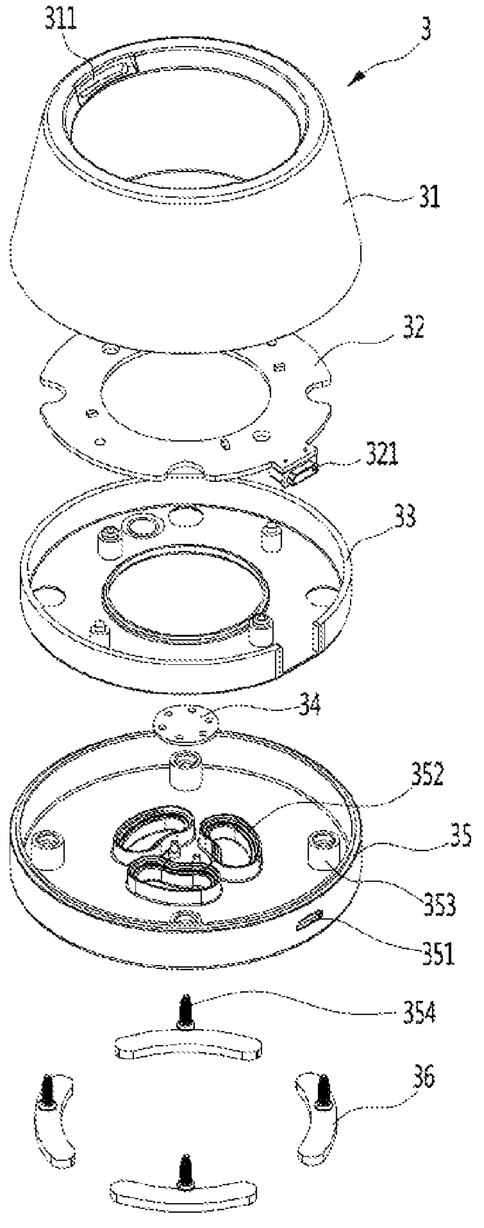

【Fig. 9】
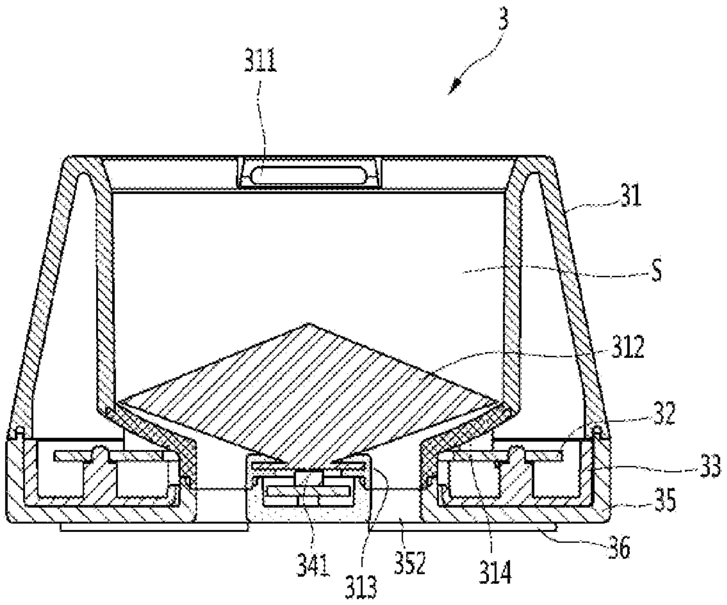

【Fig. 10】
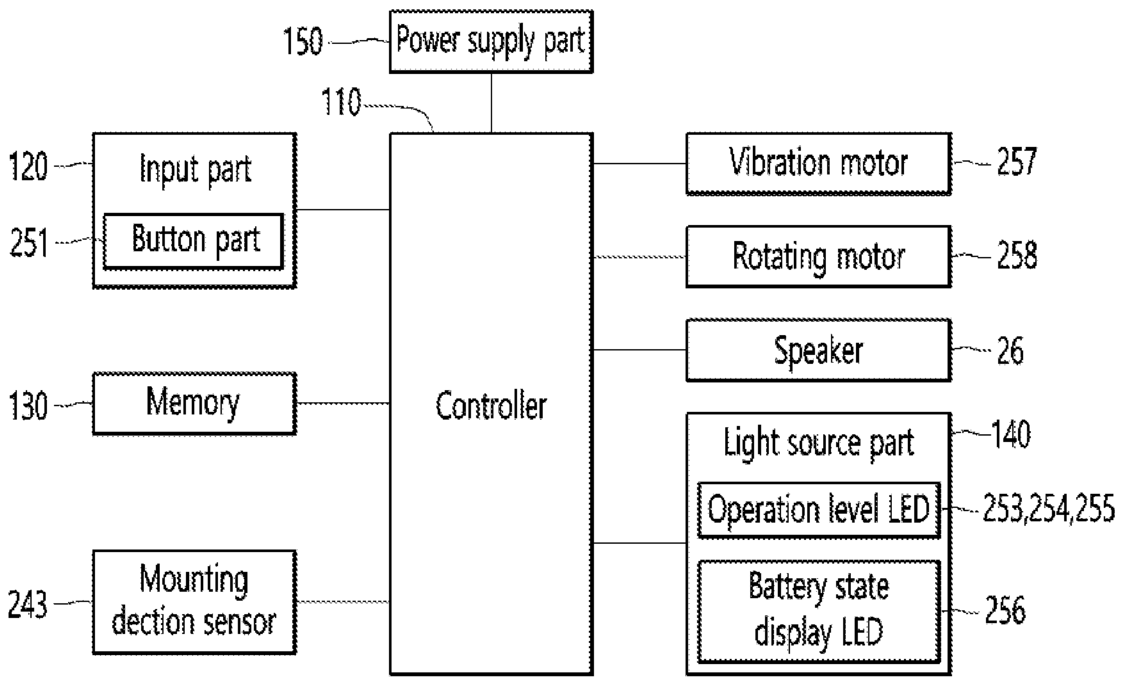
【Fig. 11】
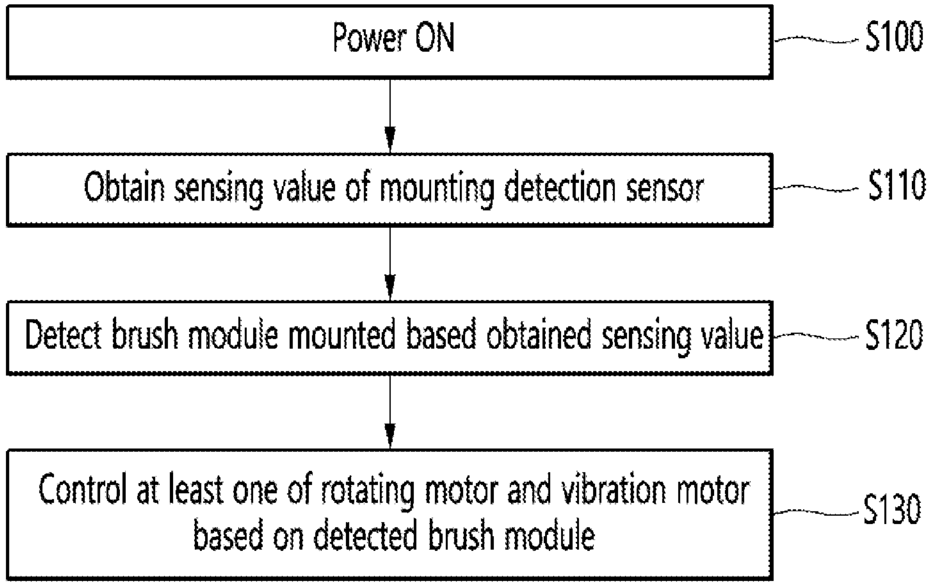

SKIN CARE DEVICE AND OPERATION METHOD THEREFOR

CROSS-REFERENCE TO RELATED APPLICATIONS

This application is the National Stage filing under 35 U.S.C. 371 of International Application No. PCT/KR2019/003256, filed on Mar. 20, 2019, the contents of which are all incorporated by reference herein in its entirety.

TECHNICAL FIELD

The present disclosure relates to a skin care device and a method for operating the same.

BACKGROUND ART

Skin care aims at maintaining clean, soft skin without blemishes, and in particular, the most interest is formed in skin care of the face among body parts. Therefore, people want to keep their skin clean by receiving a massage, applying a functional cosmetic product, or using various cleaning products for facial skin care.

Among them, the importance of washing the face to remove wastes from the skin is gradually increasing, and for washing the face, people apply a cleansing product to their face by hand and then wash them with water to remove wastes from the skin.

However, when washing your face using your hands, since the cleaning products may not be delivered evenly to the skin and bacterial infection may occur by the hands, recently, the method of indirectly applying the cleaning products to the face using various tools is being used. In particular, among these tools, a face-washing method using a skin care device that generates vibration or rotation, including a brush, is in the spotlight.

DISCLOSURE

Technical Problem

An object to be solved by the present disclosure is to implement a skin care device that provides a skin care function using brush modules of various materials.

Another object to be solved by the present disclosure is to provide a skin care device that performs an optimal operation according to a type of a brush module mounted on a main body.

Technical Solution

A skin care device according to an embodiment of the present disclosure includes a brush module mounting part on which a brush module having a brush fixed thereto is mounted, a vibration motor configured to vibrate the brush module mounting part and the brush module in one direction, a rotating shaft formed in the one direction and configured to be fastened to the brush module mounting part, a rotating motor configured to be connected to the rotating shaft, a mounting detection sensor configured to be obtain a sensing value related to the mounting of the brush module, and a controller configured to detect the type of the mounted brush module on the basis of the sensing value and control driving of at least one of the vibration motor and the rotating motor according to the detected type.

According to an embodiment, the brush module may include a brush base to which the brush is fixed to one surface thereof, a magnetic body receiving part fastened to the other surface of the brush base, and a magnetic body received in a space between the magnetic body receiving part and the brush base, and the mounting detection sensor may include a Hall sensor.

According to an embodiment, the brush module may include a first brush module provided with a fine bristle brush and a second brush module provided with a silicon brush formed of a plurality of silicon protrusions, and the magnetic bodies provided in the first brush module and the second brush module may have different magnetic field sizes from each other, respectively.

The skin care device may further include a memory configured to store a sensing value range corresponding to the first brush module and a sensing value range corresponding to the second brush module.

The controller may drive the rotating motor, when the sensing value obtained from the mounting detection sensor corresponds to the sensing value range of the first brush module.

The controller may drives the vibration motor when the sensing value obtained from the mounting detection sensor corresponds to the sensing value range of the second brush module.

According to an embodiment, a receiving space recessed into the inside thereof may be formed on one surface of the brush module mounting part, and the magnetic body receiving part and the magnetic body may be received in the receiving space when the brush module is mounted.

A fastening part which is fastened to the rotating shaft may be formed on the bottom surface of the brush module mounting part, and a fastening protrusion protruding to the outside may be formed on the outer circumferential surface of the bottom surface, so that the brush module is fastened thereto.

According to an embodiment, the brush module may include a brush base on which the brush is fixed to one surface thereof, a partial region of the other surface of the brush base may protrude in the opposite direction of the brush, and a protrusion may be formed at a distal end of the protruding partial region, which protrudes inward to correspond to the fastening protrusion and is fastened to the fastening protrusion.

The fastening protrusion may form an inclined surface whose lower side protrudes longer than the upper side thereof, and the protrusion may form an inclined surface with a shorter protrusion length toward the distal end.

The protruding partial region may be located outside the brush module mounting portion.

A method for operating a skin care device according to an embodiment of the present disclosure includes a step of receiving power on input or a selection input of an operating level, in response to the received input, a step of obtaining a sensing value from a mounted detection sensor, a step of detecting a brush module mounted on a main body of the skin care device based on the obtained sensing value, and based on the detected brush module, a step of controlling the driving of at least one of the rotating motor and the vibration motor provided in the main body thereof, in which, in the step of controlling, when the detected brush module is a first brush module having fine bristles, the rotating motor is driven, and when the detected brush module is a second brush module including a plurality of silicon protrusions, the vibration motor is driven.

In the step of detecting, when the sensing value is included in the first sensing value range corresponding to the first brush module, the brush module mounted on the main body may be detected as the first brush module, and when the sensing value is included in a range of a second sensing value corresponding to the second brush module, the brush module mounted on the main body may be detected as the second brush module.

According to an embodiment, the method for operating a skin care device may further include, when the sensing value is not included in each of the first sensing value range and the second sensing value range, a step of controlling a speaker or at least one light source to request mounting or remounting of the brush module.

Advantageous Effect

According to an embodiment of the present disclosure, the skin care device may provide various skin care functions by being implemented such that the brush module is detachably attached to the main body thereof and replacing various types of brushes.

In addition, the skin care device can provide an optimal skin care function using the mounted brush module by automatically detecting the type of the brush module mounted on the main body and controlling the driving of the vibration motor and/or the rotating motor differently.

In addition, since the skin care device has a fastening structure for firmly mounting the brush module, it is possible to effectively prevent the brush module from being detached during use of the skin care device.

In addition, since the skin care device has a structure for minimizing the distance between the magnetic body of the brush module and the mounting detection sensor of the main body, the type of the brush module mounted on the main body can be more accurately detected.

DESCRIPTION OF DRAWINGS

FIG. 1 is a perspective view illustrating a skin care device according to an embodiment of the present disclosure.

FIG. 2 is a perspective view illustrating a state where the main body and the cradle included in the skin care device according to an embodiment of the present disclosure are separated.

FIG. 3 is an exploded perspective view illustrating a main body included in a skin care device according to an embodiment of the present disclosure.

FIG. 4 is an exploded perspective view illustrating components provided inside the case of the main body illustrated in FIG. 3.

FIG. 5 is a cross-sectional view illustrating a brush module and a portion of a main body of a skin care device according to an embodiment of the present disclosure, seen in the first direction.

FIG. 6 is a cross-sectional view illustrating a brush module and a portion of a main body of a skin care device according to an embodiment of the present disclosure, seen in the second direction.

FIG. 7 is an enlarged view illustrating region A illustrated in FIG. 5.

FIG. 8 is an exploded perspective view illustrating a cradle included in a skin care device according to an embodiment of the present disclosure.

FIG. 9 is a cross-sectional view illustrating a cradle included in a skin care device according to an embodiment of the present disclosure.

FIG. 10 is a block diagram schematically illustrating a control configuration included in a skin care device according to an embodiment of the present disclosure.

FIG. 11 is a flowchart illustrating an operation of a skin care device according to an embodiment of the present disclosure.

BEST MODE

Hereinafter, the embodiments disclosed in the present specification will be described in detail with reference to the accompanying drawings, but the same or similar components are assigned the same reference numerals regardless of reference numerals, and overlapping descriptions thereof will be omitted. The suffixes "module" and "part" for the components used in the following description are given or mixed in consideration of only the ease of writing the specification, and do not have distinct meanings or roles by themselves. In addition, in describing the embodiments disclosed in the present specification, if it is determined that detailed descriptions of related known technologies may obscure the subject matters of the embodiments disclosed in the present specification, the detailed description thereof will be omitted. In addition, it should be understood that the accompanying drawings are only for easy understanding of the embodiments disclosed in the present specification, and the technical spirit disclosed herein is not limited by the accompanying drawings, and all changes, equivalents, and substitutes included in the spirit and the technical scope of the present disclosure are included.

Terms including an ordinal number, such as first and second, may be used to describe various components, but the components are not limited by the terms. The above terms are used only for the purpose of distinguishing one component from another.

When a component is referred to as being "connected" or "accessed" to another component, it should be understood that the component may be directly connected or accessed to another component, but there may be other components in between. On the other hand, when it is said that a component is "directly connected" or "directly accessed" to another element, it should be understood that there are no other component in between.

The singular expression includes the plural expression unless the context clearly dictates otherwise.

It should be understood that, in the present application, terms such as "comprises" and "have" are intended to designate that a feature, number, step, operation, component, part, or combination thereof described in the specification exists, but this does not preclude the possibility of the existence or addition of one or more other features, numbers, steps, operations, components, parts, or combinations thereof.

Hereinafter, embodiments of the present disclosure will be described in detail with reference to the accompanying drawings in the present specification.

FIG. 1 is a perspective view illustrating a skin care device according to an embodiment of the present disclosure, and FIG. 2 is a perspective view illustrating a state where the main body and the cradle included in the skin care device according to an embodiment of the present disclosure are separated.

Referring to FIGS. 1 and 2, a skin care device 1 according to an embodiment of the present disclosure may be a device for cleaning the skin by contacting the user's skin or for massaging the skin by applying a certain stimulus to the skin. The skin care device 1 may include a main body 2 and a cradle 3.

The main body 2 may have a shape that is easy for a user to clean the skin or massage the skin by holding the main body by hand and being one end provided with the brush 211 in close contact with the skin. For example, the main body 2 may include a case 25 in which at least a portion has a cylindrical shape, so that the user can easily grasp the case 25 by hand.

The main body 2 may include a brush 211 at one end. As illustrated in FIG. 2, one end of the main body 2 provided with the brush 211 may be wider than the other end of the main body 2.

The main body 2 may include a button part 251 disposed on the case 25. The user may turn on/off the power of the skin care device 1 or select/change the skin care mode by manipulating the button part 251, or the like.

The cradle 3 may be connected (or mounted) to the main body 2 to supply power for charging the battery 259 (refer to FIG. 4) provided in the main body 2. To this end, the cradle 3 may include a cradle contact terminal 311 in contact with the main body contact terminal provided on the main body 2.

The cradle 3 may have a cylindrical shape that increases in width toward a lower portion. In particular, the upper inner circumference of the cradle 3 is formed to be larger than the outer circumference of the brush 211, so that the brush 211 can be received inside the cradle 3 when the main body 2 is mounted on the cradle 3.

In addition, the cradle 3 according to an embodiment of the present disclosure may include a sterilization module for sterilizing the brush 211 provided in the main body 2.

Hereinafter, components provided in the main body 2 will be described with reference to FIGS. 3 to 4.

FIG. 3 is an exploded perspective view illustrating a main body included in a skin care device according to an embodiment of the present disclosure, FIG. 4 is an exploded perspective view illustrating components provided inside the case of the main body illustrated in FIG. 3, FIG. 5 is a cross-sectional view illustrating a brush module and a portion of a main body of a skin care device according to an embodiment of the present disclosure, seen in the first direction, FIG. 6 is a cross-sectional view illustrating a brush module and a portion of a main body of a skin care device according to an embodiment of the present disclosure, seen in the second direction, and FIG. 7 is an enlarged view illustrating region A illustrated in FIG. 5.

In the following drawings, a portion of the main body 2 where the brush module 21 is disposed is defined as an upper portion of the main body 2, and a portion where the speaker 26 is disposed is defined as a lower portion of the main body 2.

Referring to FIGS. 3 to 6, the main body 2 may include a brush module 21, a brush module mounting part 23, an upper cover 24, a case 25, a speaker 26, and a lower cover 27.

The brush module 21 may include a brush 211 and a brush base 212.

The brush 211 may be in close contact with the skin to clean the skin or massage the skin. The brush 211 may include a plurality of fine-bristles. For example, the fine-bristles are implemented with a material such as polyurethane, polyethylene, polyester, polyether, polypropylene, polystyrene, ABS, SAN, acrylic, polyamide, polycarbonate, polyethylene terephthalate, plastic such as nylon, natural fiber, and artificial fiber.

Meanwhile, the brush 211 may be implemented as a silicon brush including a plurality of silicon protrusions. The silicon protrusion of the silicon brush may be thicker than the above-mentioned fine-bristles.

In other words, the skin care device 1 may be equipped with any one of the first brush module including the fine-bristles and the second brush module including the silicone brush. The skin care device 1 may detect a brush module mounted on the main body 2 among the first brush module and the second brush module and control a vibration motor 257 and a rotating motor 285 to be described below in order to provide a skin care function corresponding to the detected brush module. This will be described later with reference to FIGS. 10 to 11.

The brush 211 may be fixed (or attached) to one surface (for example, an upper surface) of the brush base 212.

According to an embodiment, the brush base 212 may include a light emitting device for notifying information about the replacement cycle of the brush 211. The controller 110 of the main body 2 (refer to FIG. 10) may notify the user of information on whether the brush 211 needs to be replaced through a light emitting device based on the usage time of the brush 211.

Meanwhile, a magnetic body receiving part 221 may be formed under the brush base 212. The magnetic body receiving part 221 may be fastened to the bottom surface of the brush base 212 by a screw 223. A magnetic body 222 may be received in a space formed between the bottom surface of the brush base 212 and the magnetic body receiving part 221. For example, the space may be formed in a donut shape, and the magnetic body 222 may have a donut shape corresponding to the space.

The brush module 21 may be mounted on the main body 2 through the brush module mounting part 23. Meanwhile, a fastening part 231 to which a portion of the rotating shaft 232 of the main body 2 is fastened may be formed on the bottom surface of the brush module mounting part 23. Accordingly, when the rotating shaft 232 rotates by the driving force of the rotating motor 258, the brush module mounting part 23 and the brush module 21 may rotate together.

In addition, a receiving groove in which the magnetic body receiving part 221 is received may be formed on the upper surface of the brush module mounting part 23. Since the magnetic body receiving part 221 is received in the receiving groove, the distance between the mounting detection sensor 243 and the magnetic body 222 provided in the main body 2 may be minimized. As the distance between the magnetic body 222 and the mounting detection sensor 243 is minimized, the mounting detection sensor 243 may obtain a more accurate sensing value, and the controller 110 can accurately detect the type of the brush module mounted on the main body 2.

In addition, a fastening protrusion 23A for firmly fastening the brush module 21 may be further formed on the lower outer circumferential surface of the brush module mounting part 23. In addition, a protrusion 212A protruding inwardly corresponding to the fastening protrusion 23A may be formed at a lower portion of the brush base 212. The protrusion 212A and the fastening protrusion 23A allow the brush module 21 to be securely fastened to the brush module mounting part 23, so that it is possible to prevent the brush module 21 from being separated from the main body 2 when the skin care device 1 is operated. This will be described in more detail with reference to FIG. 7.

Referring to FIG. 7, a fastening protrusion 23A protruding to the outside may be formed on the lower outer circumferential surface of the brush module mounting part 23.

In addition, the brush base 212 may be formed such that a partial region of the bottom surface thereof protrudes downward. A protrusion 212A protruding inwardly corresponding to the fastening protrusion 23A may be formed at the distal end of the protruding region.

The fastening protrusion 23A may form an inclined surface whose lower side protrudes outwardly longer than the upper side. In addition, the lower side of the protrusion 212A may be formed with an inclined surface having a lower protrusion length toward the inside compared to the upper side thereof. Accordingly, when the brush module 21 is fastened to the brush module mounting part 23, it can be easily fastened with a small force by the inclined surfaces. In addition, since the brush module 21 can be securely fastened to the brush module mounting part 23, it is possible to prevent the brush module 21 from being separated from the main body 2 during operation of the skin care device 1.

Meanwhile, in order for the brush base 212 to be fastened to the brush module mounting part 23, the protruding area of the brush base 212 may be formed to be located outside the outer circumferential surface of the brush module mounting part 23. In other words, the brush module mounting part 23 may be received in the inner space formed by the protruding area of the bottom surface of the brush base 212.

With continued reference to FIGS. 3 to 6, an upper cover 24 may be formed between the brush module mounting part 23 and the case 25. The upper cover 24 may be formed to cover the upper portion of the main body 2. For example, the upper cover 24 may be fastened to the upper cover fixing part 25C of the main body 2 by the upper cover fastening member 241.

A partial region including the central portion of the upper surface of the upper cover 24 may be recessed inward to form a receiving space in which the lower portion of the brush base 212 and the brush module mounting part 23 are received.

In addition, a through-hole may be formed in the center of the recessed area of the upper cover 24. The fastening part 231 of the brush module mounting part 23 and the rotating shaft 232 may be fastened to each other through the through-hole.

Although not illustrated, the upper cover 24 may have a main body contact terminal that comes into contact with the cradle contact terminal 311 of the cradle 3 and receives power for charging the battery 259 from the cradle 3. When the main body 2 is mounted on the cradle 3 and the main body contact terminal and the cradle contact terminal 311 are in contact with each other, the power from the cradle 3 can be supplied to the battery 259 through the cradle contact terminal 311 and the main body contact terminal.

Although not illustrated, a sealing member may be provided between the upper cover 24 and the case 25. The sealing member may seal a gap between the upper cover 24 and the case 25 to prevent water or cleaning products from permeating into the case 25. The sealing member may be implemented with a material such as rubber and silicone.

The case 25 may form an outer appearance of the main body 2, and a receiving space for receiving various configurations for the operation of the main body 2 may be formed therein. As described above with reference to FIGS. 1 and 2, at least a portion of the case 25 may be formed in a cylindrical shape so that a user can easily hold the case by hand.

The case 25 may have a button part through groove 252 through which the button part 251 connected to the internal substrate protrudes to the outside.

A speaker 26 may be provided at a lower portion of the main body 2. The speaker 26 may output sounds such as beeps, voices, and various sounds according to the operating state of the main body 2.

The lower cover 27 is coupled to the case 25 so as to cover the lower portion of the main body 2 and may protect various components inside the case 25. A speaker hole for smoothly outputting sound from the speaker 26 to the outside may be formed in the lower cover 27. Due to the speaker hole, a portion of the speaker 26 may be opened to the outside.

According to an embodiment, a speaker sealing member 261 for waterproofing the speaker 26, and a speaker fixing part 262 for fixing the speaker 26 and the speaker sealing member 261 to the inner frame 25B inside the main body 2 may be further formed between the speaker 26 and the lower cover 27.

Referring to FIGS. 4 to 6, inner frames 25A and 25B, an upper cover fixing part 25C, a substrate 25D, and a connection part 25E may be provided inside the case 25.

Various components inside the main body 2 may be mounted or connected to the inner frames 25A and 25B. For example, the upper cover fixing part 25C and the substrate 25D may be mounted on the inner frames 25A and 25B. In addition, a rotating motor 258, a rotating motor fixing part 258A, and a battery 259 may be mounted on the inner frames 25A and 25B.

The rotating motor 258 may provide power for the rotation operation of the brush module 21. When the rotating motor 258 operates, the connection part 25E connected to the rotating motor 258 may rotate. As the connection part 25E rotates, the rotating shaft 232 fixed to the connection part 25E, the brush module mounting part 23 to which the rotating shaft 232 is fastened, and the brush module 21 mounted on the brush module mounting part 23 can be rotated.

The rotating motor fixing part 258A fixes the rotating motor 258 to the inner frame 25A, thereby preventing separation during operation of the rotating motor 258.

The battery 259 may supply power for the operation of various components provided in the main body 2. For example, the battery 259 may supply power required to operate the components included in the substrate 25D and drive the motors 257 and 258.

When the main body 2 is mounted on the cradle 3, the battery 259 may be charged by power supplied from the cradle 3.

A vibration motor receiving part 257A for receiving the vibration motor 257 may be formed in the upper cover fixing part 25C to which the upper cover 24 is fixed. The vibration motor 257 may be disposed between the vibration motor receiving part 257A and the inner frame 25A, and thus the vibration motor 257 may be prevented from being separated when the vibration motor 257 is driven. According to the driving of the vibration motor 257, the upper cover fixing part 257C, the upper cover 24, the brush module mounting part 23, and the brush module 21 may vibrate in the vertical direction.

Meanwhile, between the upper cover 24 and the upper cover fixing part 25C, a mounting detection sensor 243 for detecting the mounting of the brush module 21 may be disposed. For example, the mounting detection sensor 243 is disposed on the upper cover fixing part 25C and thus may be implemented to be close to the magnetic body 222 of the brush module 21 within a predetermined distance.

The mounting detection sensor 243 may be implemented as a hall sensor that detects the magnitude of a magnetic field generated from the magnetic body 222 provided in the brush module 21. The controller 110 may detect whether the brush module 21 is mounted based on a sensing value by the mounting detection sensor 243.

In addition, the magnetic body provided in the brush module may be different from each other according to the type of the brush module. In this case, the mounting detection sensor 243 may obtain different sensing values according to the type of the brush module mounted on the main body 2. The controller 110 may detect the type of the brush module currently mounted on the main body 2 based on the obtained sensing value.

A controller 110 (see FIG. 10) for controlling the overall operation of the main body 2 may be provided on the substrate 25D. The controller 110 may be implemented with an integrated circuit (IC), a microcomputer, an embedded processor, a CPU, an application processor (AP), or the like.

The substrate 25D may have a button part 251 for turning on/off the power of the main body 2 or changing the operation level (or operation mode) of the main body 2, and operation level LEDs 253, 254, and 255 indicating the selected operation level, and a battery status display LED 256 indicating the battery status.

The connection part 25E may be connected to the rotating motor 258 to rotate clockwise and counterclockwise based on the driving of the rotating motor 258. For example, the connection part 25E may be connected to rotate alternately in a clockwise direction and a counterclockwise direction based on the driving of the rotating motor 258, but is not limited thereto. As the connection part 25E rotates, while the rotating shaft 232 fastened to the connection part 25E, the brush module mounting part 23 fastened to the rotating shaft 232, and the brush module 21 fastened to the brush module mounting part 23 rotate, it is possible to perform a management operation (removal of waste or the like) for the user's skin site.

Meanwhile, as the vibration motor 257 is driven, the connection part 25E, the upper cover 24, or the upper cover fixing part 25C may vibrate in the vertical direction. In this case, the brush module mounting part 23 in contact with the upper cover 24 and the brush module 21 fastened to the brush module mounting part 23 may also come into contact with the user's skin while vibrating in the vertical direction.

Hereinafter, components provided in the cradle 3 will be described with reference to FIGS. 8 and 9.

FIG. 8 is an exploded perspective view illustrating a cradle included in a skin care device according to an embodiment of the present disclosure.

Referring to FIG. 8, the cradle 3 includes an upper case 31 and a lower case 35, and a charging module 32, an inner case 33 to which the charging module 32 is fastened, and a sterilization module 34 may be provided between the upper case 31 and the lower case 35.

The upper case 31 may form the overall outer appearance of the cradle 3. A receiving space for receiving the brush 211 of the main body 2 may be formed in the upper case 31. As described above in FIGS. 1 and 2, the minimum inner circumference of the upper case 31 is formed to be larger than the outer circumference of the brush 211, so that when the main body 2 is mounted on the cradle 3, the brush 211 may be received in the upper case 31.

The charging module 32 may perform an operation of supplying power to the battery of the main body 2 when the main body 2 is mounted on the cradle 3. The charging module 32 may include a power supply terminal 321 to receive power from the outside through the power supply terminal 321.

As the main body 2 is mounted on the cradle 3, when the main body contact terminal and the cradle contact terminal 311 are in contact with each other, the charging module 32 can charge the power of the battery 259 by supplying power supplied from the outside through the power supply terminal 321 to the battery 259 through the cradle contact terminal 311 and the main body contact terminal. To this end, the charging module 32 may be electrically connected to the cradle contact terminal 311.

According to an embodiment, the charging module 32 may obtain information on the power state of the battery 259 and stop supplying power to the battery 259 when the battery 259 is fully charged.

The inner case 33 provided between the upper case 31 and the lower case 35 may have a receiving space for receiving the charging module 32 and may include a fastening part fastened to the charging module 32. Also, the inner case 33 may be received in the lower case 35.

The sterilization module 34 may perform a sterilization operation to remove bacteria that may be generated due to continuous use of the inner brush 211 and the outer brush 221. For example, the sterilization module 34 may correspond to an ultraviolet sterilization module that emits ultraviolet light to the brushes 211 and 221.

Ultra violet (UV) light may be classified into UV-A (315-400 nm), UV-B (285-315 nm), and UV-C (200-280 nm) according to wavelength. For example, the sterilization module 34 may include a UV-C LED irradiating light of a UV-C wavelength.

Since the ultraviolet light of the UV-C wavelength cannot be checked with the naked eye of the user, it may be difficult for the user to check whether the sterilization module 34 is operating properly. According to an embodiment, the sterilization module 34 may further include an LED for irradiating light of a specific color (for example, blue). The LED may be irradiated together with light of the specific color when the UV-C LED irradiates light of a UV-C wavelength. The user can easily check whether the sterilization module 34 is operating by checking the specific color to the naked eye. According to an embodiment, the LED irradiating light of a specific color may notify the user that the charging of the battery 259 is complete by irradiating light when the charging of the main body 2 is completed.

In order for the light irradiated from the sterilization module 34 to pass through the charging module 32 and the inner case 33 to reach the brushes 211 and 221, a light through-hole may be formed at the center of the charging module 32 and the inner case 33.

The sterilization module 34 may be fixed to the lower case 35, but this is not necessarily the case.

The lower case 35 may receive the inner case 33, the charging module 32 fastened to the inner case 33, and the sterilization module 34.

The lower case 35 may include an insertion groove 351 through which an external power supply part is inserted to be connected to the power supply terminal 321. When the external power supply part unit and the power supply terminal 321 are connected through the insertion groove 351, the charging module 32 may supply power supplied from the outside to the battery 259 of the main body 2. In addition, the sterilization module 34 may operate using the power supplied from the outside.

The lower case 35 may further include at least one discharge hole 352 for discharging the water remaining in the brushes 311 and 321 to the outside of the cradle 3. The at least one discharge hole 352 is formed to be spaced apart from the center of the lower case 35, and inside the inner boundary surface of the at least one discharge hole 352, that is, in the center of the lower case 35, the sterilization module 34 may be placed. An upper portion of the at least one discharge hole 352 may be formed to protrude through the light through-hole of the inner case 33 and the charging module 32. Accordingly, the phenomenon that the water flowing from the brushes 211 and 221 is discharged to the outside (the lower part of the cradle 3) through the discharge hole 352 and the water flows into the charging module 32 or the inner case 33 can be prevented.

In order to pass through the light through-hole of the inner case 33 and the charging module 32, the discharge hole 352 may be formed along a concentric circle spaced a predetermined distance from the center of the lower case 35. In this case, the diameter of the concentric circles may be smaller than the diameters of the light through-holes of the inner case 33 and the charging module 32.

The lower case 35 may be fastened to the upper case 31 through at least one fastening part 353 and a screw 354. To this end, the inner case 33 may include at least one through-hole through which the fastening part 353 of the lower case 35 passes. In addition, at least one groove through which at least a portion of the fastening part 353 passes may be formed at the edge of the charging module 32.

According to an embodiment, a pad 36 for suppressing horizontal movement such as sliding of the cradle 3 may be provided on the bottom surface of the lower case 35. The pad 36 may be attached to the bottom surface of the lower case 35. The pad 36 may be implemented with a material such as silicon or rubber.

FIG. 9 is a cross-sectional view illustrating a cradle included in a skin care device according to an embodiment of the present disclosure.

Referring to FIG. 9, the upper case 31 may have a cylindrical shape in which the outer circumference is widened downward, and the inner circumference may have a constant cylindrical shape. Accordingly, when the main body 2 is mounted on the cradle 3, the cradle 3 may stably support the main body 2, and the main body 2 may be stably mounted on the cradle 3.

A receiving space S for receiving the brush 211 may be formed in the upper case 31 when the main body 2 is mounted. As described above, the inner circumference of the upper case 31 may be greater than the outer circumference of the brush 211.

When the main body 2 is mounted on the cradle 3, the sterilization module 34 provided in the cradle 3 may perform a sterilization operation on the brush 211. As described above, the sterilization module 34 may include a UV-C LED 341 irradiating light of a UV-C wavelength. Light irradiated from the UV-C LED 341 may be diffused by the light diffuser 312 to be evenly incident on the brush 211.

As the UV-C wavelength light is incident on the brush 211, a sterilization operation may be performed on the brush 211.

The light diffuser 312 may be disposed between the receiving space S and the sterilization module 34. The light diffuser 312 may be implemented with a transparent material, such as acrylic, to diffuse the light irradiated from the UV-C LED 341 and allow the diffused light to be incident on the brush 211.

As illustrated in FIG. 9, the upper surface of the light diffuser 312 may have an inclined surface whose height decreases from the center to the edge. This not only serves to disperse the UV-C wavelength light, but also allows water or cleaning products flowing down from the brush 211 to go down the inclined surface of the light diffuser 312 and be easily discharged to the outside through the discharge hole 352.

In order to prevent water or cleaning products flowing down from the brush 211 from flowing into the sterilization module 34 along the light diffuser 312, a sterilization module sealing part 313 may be formed at the lower portion of the light diffuser 312. The sterilization module sealing part 313 is formed between the lower part of the light diffuser 312 and the inner boundary surface of the discharge hole 352, so that it can be prevented that water or cleaning products enters into the sterilization module 34 disposed in the central part of the lower case 35.

In addition, in order to prevent water or cleaning products flowing down from the brush 211 from flowing into the charging module 32, the charging module sealing part 314 may be formed between the inner circumferential surface of the upper case 31 and the outer boundary surface of the discharge hole 352.

The sterilization module sealing part 313 and the charging module sealing part 314 may be implemented with Teflon, silicone, or rubber.

FIG. 10 is a block diagram schematically illustrating a control configuration included in a skin care device according to an embodiment of the present disclosure.

Referring to FIG. 10, the skin care device 1 may include a controller 110, an input part 120, a memory 130, a mounting detection sensor 243, a vibration motor 257, a rotating motor 258, and a speaker 26, a light source part 140, and a power supply part 150.

The controller 110 is a component that controls the overall operation of the skin care device 1 and may include at least one controller (or processor). As described above with reference to FIG. 4, the controller 110 may be implemented as an integrated circuit (IC), a microcomputer, an embedded processor, a CPU, an application processor (AP), or the like.

The input part 120 may include means for receiving an input for changing/selecting a power state or an operation state (operation level, operation mode, or the like) of the skin care device 1 from a user. For example, the input part 120 may include the button part 251 described above with reference to FIG. 4.

The memory 130 may store various information such as control data related to a skin care operation of the skin care device 1 and state information of components included in the skin care device 1.

In particular, the memory 130 according to an embodiment of the present disclosure can store information on a first sensing value range corresponding to a first brush module including fine-bristles, and information on a second sensing value range corresponding to a second brush module including a silicon brush.

The mounting detection sensor 243 is a sensor for detecting the type of the brush module mounted (fastened) to the brush module mounting part 23 of the main body 2 and may be implemented as, for example, a hall sensor. The hall sensor corresponds to a sensor that detects the magnitude or direction of a magnetic field using the hall effect. In other words, the sensing value of the mounting detection sensor 243 may correspond to the magnitude of the magnetic field generated by the magnetic body 222 included in the brush module 21.

When the sensing value sensed by the mounting detection sensor 243 is included in the first sensing value range information, the controller 110 may detect that the brush module mounted on the main body 2 is the first brush module. On the other hand, when the sensing value sensed by the mounting detection sensor 243 is included in the second sensing value range information, the controller 110 can detect that the brush module mounted on the main body 2 is the second brush module.

When it is sensed that the first brush module is mounted, the controller 110 may drive the rotating motor 258 to rotate the first brush module. On the other hand, when it is sensed that the second brush module is mounted, the controller 110 may drive the vibration motor 257 to vibrate the second brush module.

According to an embodiment, when the sensed sensing value is not included in each of the first sensing value range information and the second sensing value range information, the controller 110 can detect that the brush module is installed abnormally or that the brush module is not installed. In this case, the controller 110 may request mounting or remounting of the brush module through the speaker 26 or the light source part 140.

The light source part 140 may provide information related to the operation or state of the skin care device 1 using at least one light source (for example, LED). For example, as described above in FIG. 4, the light source part 140 may include the operation level LEDs 253, 254, 255 indicating the operation level (or operation mode) of the skin care device 1, and a battery status indication LED 256 indicating a state of the battery 259.

The power supply part 150 may supply power for each operation of the components included in the skin care device 1. For example, the power supply part 150 may include the battery 259 described above with reference to FIG. 4.

FIG. 11 is a flowchart illustrating an operation of a skin care device according to an embodiment of the present disclosure.

Referring to FIG. 11, when the skin care device 1 is powered on (S100), the controller 110 may obtain a sensing value using the mounted detection sensor 243 (S110).

For example, the user may operate the button part 251 to turn on the power of the skin care device 1. Alternatively, the user may select the operation level (or operation mode) of the skin care device 1 by manipulating the button part 251.

When power is turned on or an operation level is selected by manipulation of the button part 251, the controller 110 may control the mounting detection sensor 243 to obtain a sensing value.

The skin care device 1 detects the brush module mounted on the main body 2 based on the obtained sensing value (S120), and based on the type of the detected brush module, at least one of the vibration motor 257 and the rotating motor 258 can be controlled (S130).

As described above, the brush module mounted on the main body 2 of the skin care device 1 may include a first brush module including fine-bristles and a second brush module including a silicone brush.

The fine-bristles of the first brush module may have a lower hardness than a silicon brush. Accordingly, the first brush module may be effective in removing wastes or foreign substances from the skin surface by rotating (moving) in a direction parallel to the skin contact surface. Meanwhile, the second brush module vibrates (moves) in the vertical direction of the main body 2, and thus may be effective in removing wastes that have permeated into the skin.

The controller 110 may detect the brush module mounted on the main body 2 based on the sensing value obtained from the mounting detection sensor 243, the first sensing value range information and the second sensing value range information stored in the memory 130.

For example, when the sensing value is included in the first sensing value range information, the controller 110 may detect that the first brush module is mounted on the main body 2. As the mounting of the first brush module is sensed, the controller 110 may drive the rotating motor 258. As the rotating motor 258 is driven, the first brush module may perform a rotational motion while removing wastes from the skin surface.

Meanwhile, when the sensing value is included in the second sensing value range information, the controller 110 may detect that the second brush module is mounted on the main body 2. As the mounting of the second brush module is detected, the controller 110 may drive the vibration motor 257. As the vibration motor 257 is driven, the second brush module may remove wastes in the skin while vibrating in the vertical direction.

In other words, the skin care device 1 differently controls the driving of the vibration motor 257 and the rotating motor 258 according to the brush module mounted on the main body 2, thereby providing an optimal skin care function using the mounted brush module.

The above description is merely illustrative of the technical spirit of the present disclosure, and various modifications and variations will be possible without departing from the essential characteristics of the present disclosure by those skilled in the art to which the present disclosure pertains.

Therefore, the embodiments disclosed in the present disclosure are not intended to limit the technical spirit of the present disclosure, but to explain, and the scope of the technical spirit of the present disclosure is not limited by these embodiments.

The protection scope of the present disclosure should be interpreted by the following claims, and all technical ideas within the scope equivalent thereto should be construed as being included in the scope of the present disclosure.

The invention claimed is:

1. A skin care device comprising:

a brush module mounting part on which a brush module having a brush fixed thereto is mounted;

a vibration motor configured to vibrate the brush module mounting part and the brush module in a first direction;

a rotating shaft extending along the first direction and configured to be fastened to the brush module mounting part;

a rotating motor configured to be connected to the rotating shaft;

a mounting detection sensor configured to obtain a sensing value related to a mounting of the brush module; and a controller configured to detect a type of the mounted brush module based on the sensing value and control driving of at least one of the vibration motor or the rotating motor according to the detected type of the mounted brush module, wherein the brush module includes:

- a brush base having a surface to which the brush is fixed;
- a magnetic body receiving part fastened to an opposite surface of the brush base; and
- a magnetic body located in a space between the magnetic body receiving part and the brush base, and wherein the mounting detection sensor includes a Hall sensor.

2. The skin care device of claim 1, wherein the brush module further includes a first brush module provided with a fine bristle brush and a second brush module provided with a silicon brush comprising a plurality of silicon protrusions, and wherein the first brush module and the second brush module have respective magnetic bodies that have respective magnetic field sizes that are different from each other.

3. The skin care device of claim 2, further comprising:

a memory configured to store a sensing value range of the first brush module and a sensing value range of the second brush module.

4. The skin care device of claim 3, wherein the controller is further configured to drive the rotating motor based on the sensing value obtained by the mounting detection sensor corresponding to the sensing value range of the first brush module.

5. The skin care device of claim 3, wherein the controller is further configured to drive the vibration motor based on the sensing value obtained by the mounting detection sensor corresponding to the sensing value range of the second brush module.

6. The skin care device of claim 1, wherein a receiving space at an interior of the skin care device is formed at a surface of the brush module mounting part, and wherein the magnetic body receiving part and the magnetic body are located in the receiving space when the brush module is mounted.

7. The skin care device of claim 1, wherein a fastening part which is fastened to the rotating shaft is located on a bottom surface of the brush module mounting part, and wherein a fastening protrusion protruding outwards is located on an outer circumferential surface of the bottom surface, for fastening the brush module.

8. A skin care device comprising:

a brush module mounting part on which a brush module having a brush fixed thereto is mounted;

a vibration motor configured to vibrate the brush module mounting part and the brush module in a first direction;

a rotating shaft extending along the first direction and configured to be fastened to the brush module mounting part;

a rotating motor configured to be connected to the rotating shaft;

a mounting detection sensor configured to obtain a sensing value related to a mounting of the brush module; and a controller configured to detect a type of the mounted brush module based on the sensing value and control driving of at least one of the vibration motor or the rotating motor according to the detected type of the mounted brush module, wherein a fastening part which is fastened to the rotating shaft is located on a bottom surface of the brush module mounting part, wherein a fastening protrusion protruding outwards is located on an outer circumferential surface of the bottom surface, for fastening the brush module, wherein the brush module includes a brush base having a surface on which the brush is fixed, wherein a partial region of an opposite surface of the brush base protrudes away from the brush, and wherein a protrusion is located at a distal end of the partial region, the protrusion protruding inward to correspond to the fastening protrusion and fastened to the fastening protrusion.

9. The skin care device of claim 8, wherein the fastening protrusion has an inclined surface, wherein a lower side of the inclined surface protrudes more than an upper side of the inclined surface, and wherein the protrusion has an inclined surface having a shorter protrusion length toward the distal end.

10. The skin care device of claim 8, wherein the protruding partial region is located outside the brush module mounting part.

11. A method for operating a skin care device, the method comprising:

receiving a power on input or a selection input of an operating level;

obtaining a sensing value from a mounted detection sensor in response to receiving the power on input or the selection input;

detecting a brush module mounted on a main body of the skin care device based on the obtained sensing value; and controlling a driving of at least one of a rotating motor or a vibration motor provided in the main body based on detecting the brush module, wherein:

based on the brush module being detected as being a first brush module having fine bristles, the rotating motor is driven;

based on the brush module being detected as being a second brush module including a plurality of silicon protrusions, the vibration motor is driven;

the mounting detection sensor includes a Hall sensor;

each of the first brush module and the second brush module includes a magnetic body; and detecting the brush module comprises:

based on the obtained sensing value being in a first sensing value range corresponding to the first brush module, detecting the brush module as being the first brush module; and based on the obtained sensing value being in a second sensing value range corresponding to the second brush module, detecting the brush module mounted on the main body as being the second brush module.

12. The method of claim 11, further comprising:

based on the sensing value not being in each of the first sensing value range and the second sensing value range, controlling a speaker or at least one light source to request mounting or remounting of the brush module.

* * * * *